United States Patent [19]

Apeldoorn et al.

[11] 4,349,842
[45] Sep. 14, 1982

[54] TELEVISION RECEIVER FOR RECEIVING A PICTURE CARRIER WHOSE AMPLITUDE IS MODULATED WITH A VIDEO SIGNAL, AND A SOUND CARRIER WHOSE FREQUENCY IS MODULATED WITH AN AUDIO SIGNAL

[75] Inventors: Hans J. Apeldoorn; Miloslav Tryzna, both of Eindhoven, Netherlands

[73] Assignee: U.S. Philips Corporation, New York, N.Y.

[21] Appl. No.: 197,449

[22] Filed: Oct. 16, 1980

[30] Foreign Application Priority Data

Nov. 9, 1979 [NL] Netherlands .......................... 7908216

[51] Int. Cl.³ ............................................. H04N 5/62
[52] U.S. Cl. .................................................. 358/197
[58] Field of Search ................. 358/197; 455/304, 305

[56] References Cited

U.S. PATENT DOCUMENTS

| | | | |
|---|---|---|---|
| 2,901,536 | 8/1959 | Thomas, Jr. et al. | 358/197 |
| 4,219,849 | 8/1980 | Janssen et al. | 358/197 |
| 4,237,485 | 12/1980 | Saito et al. | 358/197 |

*Primary Examiner*—Richard Murray
*Attorney, Agent, or Firm*—Thomas A. Briody; William J. Streeter; Laurence A. Wright

[57] ABSTRACT

Television receiver for receiving a picture carrier whose amplitude is modulated with a video signal and a sound carrier whose frequency is modulated with an audio signal. The sound intercarrier signal produced by a mixing circuit is divided by a detected amplitude-modulated interference have, a signal of a substantially constant amplitude being thus produced. Consequently, a limiter preceding the frequency demodulator is not required.

5 Claims, 3 Drawing Figures

TELEVISION RECEIVER FOR RECEIVING A PICTURE CARRIER WHOSE AMPLITUDE IS MODULATED WITH A VIDEO SIGNAL, AND A SOUND CARRIER WHOSE FREQUENCY IS MODULATED WITH AN AUDIO SIGNAL

The invention relates to a television receiver for receiving a picture carrier whose amplitude is modulated with a video signal, and a sound carrier whose frequency is modulated with an audio signal, comprising a mixing circuit for generating the demodulated video signal and an amplitude-modulated sound intercarrier signal and further comprising a frequency demodulator for generating the demodulated audio signal.

BACKGROUND OF THE INVENTION

In such a television receiver the sound intercarrier signal is produced by the mixer circuit, this sound intercarrier signal being a signal whose frequency is modulated with the audio signal, the frequency of the carrier thereof being equal to the difference between the frequencies of the two carriers. It is furthermore affected with an unwanted amplitude modulation. In order to obtain a sound intercarrier signal which is free from amplitude modulation, it is, in known television receivers, first amplified and thereafter applied to a limiter circuit. The limited signal has a substantially constant amplitude and is applied to a frequency demodulator for producing the demodulated audio signal.

It has been found, however, that the limiting circuit introduces a phase modulation in the sound intercarrier signal. As the frequency modulation is actually a kind of phase modulation, this signal limitation means a distortion of the demodulated audio signal obtained. It will therefore be obvious that for an audio reproduction which satisfies high quality requirements it is desirable that the amplitude of the sound intercarrier signal be kept substantially constant in a different manner. The mixer circuit which produces the intercarrier signal can indeed be designed in such manner that the amplitude modulation it introduces will be small. However, the mixer circuit then behaves as a limiter and causes a phase modulation which cannot be eliminated anymore.

It should be noted that United Kingdom Pat. No. 562,702 describes a circuit for a receiver of frequency-modulated signals in which a disturbing amplitude modulation is reduced because the detected amplitude modulation is multiplied by the frequency-modulated signal of audio frequency, which is affected with this amplitude modulation. The improvement is however increased as the modulation depth of the amplitude-modulated signal is smaller, so that it is of no use for the sound section in a television receiver because of the fact that the disturbing amplitude modulation is partly caused by the picture carrier signal, which has a modulation depth of very high values, even up to 100%. In addition, the known circuit produces an envelope whose frequency is double the frequency of the disturbance and which is difficult to eliminate.

SUMMARY OF THE INVENTION

It is an object of the invention to provide a television receiver of the type described in the opening paragraph in which the sound intercarrier signal applied to the frequency demodulator is substantially free from amplitude modulation without the use of a limiting circuit. To this end the television receiver according to the invention is characterized in that there is provided a multiplying-dividing circuit for dividing the sound intercarrier signal by the amplitude modulation detected at an output terminal of the mixing circuit and for applying a sound intercarrier signal with a substantially constant amplitude to the frequency demodulator.

In a preferred embodiment the television receiver according to the invention is characterized in that the multiplying-dividing circuit comprises a function generator whose output signal is approximately inversely proportional to the input signal, and a multiplying circuit, the input signal of the function generator being the detected amplitude modulation and the output signal of the function generator being multiplied in the multiplying circuit by the sound intercarrier signal.

The television receiver according to the invention may be characterized in that the detected amplitude modulation is the demodulated video signal produced by the mixing circuit. In a different manner the receiver according to the invention may be characterized in that there is provided a demodulator circuit for amplitude demodulation of the sound intercarrier signal produced by the mixing circuit, the output signal of the demodulator circuit being the detected amplitude modulation.

A function generator for a television receiver according to the invention, comprising a differential amplifier in which the drive voltages are obtained from current-controlled diodes, may be characterized in that each diode is connected to a current source via a resistor and that a further resistor is connected to the electrodes of one diode.

BRIEF DESCRIPTION OF THE DRAWING

The invention will now be further explained by way of non-limitative example with reference to the accompanying Figures wherein.

DETAILED DESCRIPTION OF THE PREFERRED EMBODIMENTS

Figure 1:
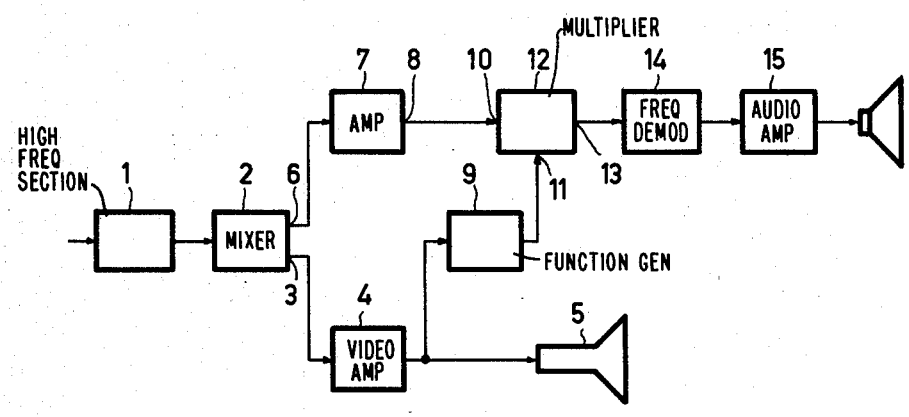
FIG. 1 shows a block schematic circuit diagram of a portion of a first embodiment of the television receiver according to the invention.

The television receiver shown in FIG. 1 has a high-frequency and intermediate-frequency section 1, to which a mixing circuit 2 is connected. A demodulated video signal present during operation at an output terminal 3 of this mixing circuit is amplified and processed in a video amplifier 4. The output signal of amplifier 4 is applied to a picture display tube 5.

A sound intercarrier signal is present at an output terminal 6 of mixing circuit 2, i.e. a signal whose frequency is modulated with an audio signal, the frequency of the carrier thereof being equal to the difference between the frequencies of the picture and the sound carrier. This signal is applied to an amplifier 7 comprising selective means. At the output terminal 8 thereof there is a frequency-modulated signal whose quiescent frequency, that is to say the frequency in the absence of modulation, is equal to the difference between the frequency of the picture carrier and the quiescent frequency of the sound carrier. For some European countries for example, the first-mentioned frequency in the intermediate frequency stages is 38.9 MHz while the said second frequency is 33.4 MHz, so that the signal at terminal 8 has a quiescent frequency of 5.5 MHz.

The output signal of amplifier 4 is also applied to a function generator 9 whose output signal is approximately inversely proportional to the input signal. This output signal is applied to an input terminal 11 of a multiplying circuit 12, while a further input terminal 10 thereof is connected to terminal 8.

The video signal at terminal 3 may be written as $(1+m \sin pt) \cos w_1 t$, in which $w_1$ is the angular velocity of the picture carrier, i.e. $2\pi \times 38.9 \times 10^6$ in the present example, while p is the angular velocity and m the modulation depth of the modulating wave. The signal at terminal 8 is then proportional to $(1+m \sin pt) \cos$ $$\left[ (w_1 - w_2) t + \frac{\Delta w}{q} \cos qt + \rho \right],$$

in which $w_2$ is the angular velocity of the sound carrier, i.e. $2\pi \times 33.4 \times 10^6$ in the present example, while q is the angular velocity of the modulating wave, $\Delta w$ the frequency shift and $\phi$ a constant angle. In these circumstances the signal at terminal 11 is proportional to $$\frac{1}{1 + m \sin pt}.$$

This shows that, for a suitable setting of the proportionality constants, the signal at the output 13 of circuit 12 does not contain the interference term $1+m \sin pt$ and has, consequently, a constant amplitude. This signal is applied to a frequency demodulator 14, whose output signal is the modulating audio signal which is amplified and processed in an audio amplifier 15.

It will be obvious that the construction of the known parts of FIG. 1 is of no importance for the invention. Circuit 2 may, for example, comprise selective networks and one or more detectors for producing, either concurrently or separately, the video and the sound inter-carrier signals as well as for producing the interference signal. It will also be obvious that the input terminal of generator 9 may be connected directly to terminal 3 or to another suitable output terminal of circuit 2.

Figure 2:
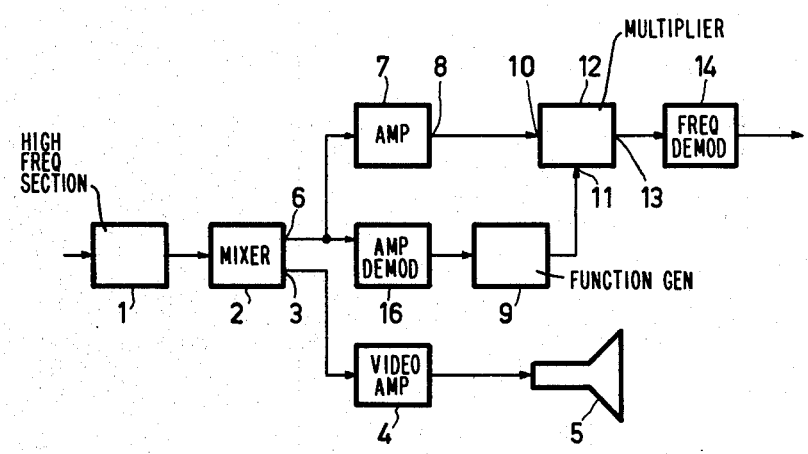
FIG. 2 shows a block schematic circuit diagram of a portion of a second embodiment of the television receiver according to the invention.

In the foregoing only the detrimental influence of the amplitude modulation of the sound carrier signal, caused by the picture carrier has been eliminated. FIG. 2 shows a portion of a television receiver in which amplitude variations of the intercarrier signal which are caused in another manner, for example, by reflections of the high-frequency signal, can also be eliminated.

The receiver of FIG. 2 comprises the same parts as the receiver shown in FIG. 1. In addition, the signal at terminal 6 is applied to an amplitude demodulator 16, while function generator 9 does not receive the video signal from terminal 3 or from amplifier 4, but the output signal of demodulator 16. This signal is of the shape $1+m' \sin p't$ where p' is the angular velocity and m' the modulation depth of the interference, which interference may have been caused by the high-frequency transmission and by the stages preceding terminal 6, as well as by the picture carrier. In a similar manner as in FIG. 1 an intercarrier signal which is substantially free from amplitude modulation is obtained at terminal 13.

Figure 3:
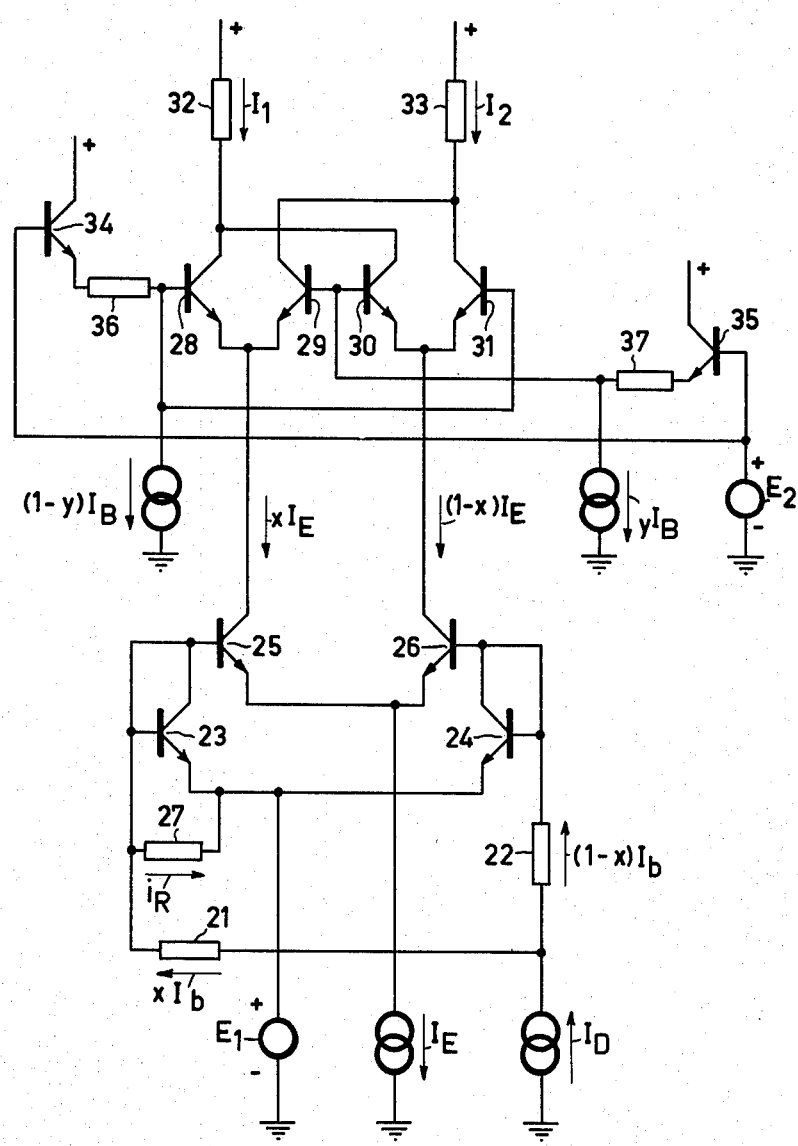
FIG. 3 shows a more detailed circuit diagram of a circuit which may be part of the television receiver according to the invention.

FIG. 3 shows a construction of a combined circuit for generator 9 and circuit 12. Via a resistor 21, a current source $I_D$ is connected to the base of a transistor 23 and via a resistor 22 to the base of a transistor 24. These transistors and also the other transistors in FIG. 3 are of the npn-type. The base of transistor 23 is connected to its collector and to the base of a transistor 25, while the base of transistor 24 is connected to its collector and to the base of a transistor 26. The emitter of transistor 23 is connected to the emitter of transistor 24 and to a constant voltage source $E_1$, whose other side is connected to the earth. A resistor 27 is included between the said emitters and the base of transistor 23. The emitters of transistors 25 and 26 are interconnected and connected to a constant current source $I_E$, whose other side is connected to earth.

The collector of transistor 25 is connected to the emitter of a transistor 28 and to the emitter of a transistor 29, while the collector of transistor 26 is connected to the emitter of a transistor 30 and to the emitter of a transistor 31. The bases of transistors 28 and 31 are interconnected and connected to a current source $(1-y)I_B$, whose other side is connected to earth, and in a similar manner the bases of transistors 29 and 30 are interconnected and connected to a current source $yI_B$, whose other side is connected to earth, y representing a number between 0 and 1. The collectors of transistors 28 and 30 are interconnected and connected to a resistor 32 and in similar manner the collectors of transistors 29 and 31 are interconnected and connected to a resistor 33, the other ends of resistors 32 and 33 being connected to a positive supply source. The bases of a transistor 34 and of a transistor 35 are interconnected and connected to a constant voltage source $E_2$, whose other side is connected to earth, while the collectors are connected to the supply source, and while the emitter of transistor 34 is connected to the bases of transistors 28 and 31 via a resistor 36 and the emitter of transistor 35 is connected to the bases of transistors 29 and 30 via a resistor 37.

The bottom portion of FIG. 3, that is to say the portion including transistors 23, 24, 25 and 26, constitutes a differential amplifier which is described in the publication "IEEE Journal of Solid-State Circuits", December 1968, pages 353 to 365, inclusive, in which the further resistor 27 has been provided. When the collector current of transistor 25 is written as $xI_E$, wherein x is a number between 0 and 1, so that the collector current of transistor 26 is equal to $(1-x)I_E$, then, as is apparent from this publication, the current flowing through resistor 21 may be written as $xI_b$, while the current flowing through the resistor 22 is equal to $(1-x)I_b$.

Let it be assumed that:

$xI_b = i_1 - i_2$ $(1-x)I_b = i_1 + i_2.$

If the current $i_R$ through resistor 27 is negligibly small with respect to current $xI_b$, which implies that the resistor has been chosen so that its value, for example 7 k$\Omega$, is many times higher than the value of the base resistance of transistors 23 and 25 during the conducting state of these transistors, then it appears that $I_D = I_b = 2i_1$ and that $(1-2x)I_b = 2i_2.$ The output signal of the described differential amplifier is the difference $xI_E - (1-x)I_E = (2x-1)I_E$ between the collector currents of transistors 25 and 26, and is approximately equal to $$-\frac{2i_2 I_E}{I_D}.$$

If the current value $i_2$ is constant then it appears herefrom that the said output signal is approximately inversely proportional to the value $I_D$. The computation shows that $i_2$ varies little and is approximately equal to $i_R/2$ when x assumes values close to 0.5, i.e. near the balanced condition for operation of the differential amplifier, the value of current $i_R$ being equal to $v_{be}/R$. Herein $v_{be}$ is the substantially constant threshold voltage of the base-emitter diode of a conducting transistor.

From the above it is apparent that the differential amplifier formed by elements 21 to 27 inclusive, is suitable for use as the generator 9. For this, in the case of FIG. 1, current source $I_D$ is a video signal source and forms part of, for example, mixing circuit 2. The output signal of the differential amplifier is then approximately inversely proportional to the video signal.

The circuit comprising elements 28 to 37 inclusive, is a multiplying circuit described in the publication "IEEE Journal of Solid-State Circuits", December 1968, pages 365 to 373 inclusive. An input signal thereof is the above-described output signal $xI_E-(1-x) I_E$ of generator 9, while another input signal is the difference between current $yI_B$ and $(1-y)I_B$. From this it appears that the output signal of the circuit is equal to $I_2 - I_1 = XY I_E$, wherein $I_1$ is the current flowing through resistor 32, while $I_2$ is the current flowing through resistor 33 and in which the new parameters X and Y are equal to $2x-1$ and $2y-1$, respectively. As a function of these parameters the input signals may be written as:

$$xI_E-(1-x)I_E=(2x-1)I_E=XI_E$$

and $$yI_B-(1-y)I_B=(2y-1)I_B=YI_B.$$

Herein $XI_E$ approximately inversely proportional to the interference. When the current sources $yI_B$ and $(1-y)I_B$ are part of amplifier 7, then $YI_B$ is the sound intercarrier signal. So the described multiplying circuit functions as the circuit 12 in FIGS. 1 and 2 and the output signal $XYI_E$ thereof is an intercarrier signal having a substantially constant amplitude. This is accomplished by a suitable choice of voltage $E_1$ and of resistors 21 and 22.

In the foregoing, a signal was generated which is inversely proportional to the interference, whereafter the resultant signal was multiplied by the intercarrier signal. It will be obvious that these operations might have been effected with other means. It would, for example, have been possible to use a multiplying-dividing circuit dividing the intercarrier signal, coming from the mixer circuit, by the interference, which is also received from the mixer circuit. Such a multiplying-dividing circuit has already been described in, for example, the above-mentioned publication "IEEE Journal of Solid-State Circuits"; December 1968, more specifically on page 358.

What is claimed is:

1. A television receiver for receiving a picture carrier whose amplitude is modulated with a video signal, and a sound carrier whose frequency is modulated with an audio signal comprising: a mixing circuit for generating the demodulated video signal and an amplitude-modulated sound intercarrier signal, a frequency demodulator for generating the demodulated audio signal, and a multiplying-dividing circuit for dividing said sound intercarrier signal by the amplitude modulation signal detected at an output terminal of said mixing circuit and for applying a sound intercarrier signal with a substantially constant amplitude to said frequency demodulator.

2. A television receiver as claimed in claim 1, wherein said multiplying-dividing circuit comprises a function generator whose output signal is approximately inversely proportional to the input signal, and a multiplying circuit, the input signal of said function generator being the detected amplitude modulation signal and the output signal of said function generator being multiplied in said multiplying circuit by the sound intercarrier signal.

3. A television receiver as claimed in one of the claims 1 or 2, wherein said detected amplitude modulation signal is the demodulated video signal produced by said mixing circuit.

4. A television receiver as claimed in one of the claims 1 or 2, comprising a demodulator circuit for amplitude demodulation of the sound intercarrier signal produced by the mixing circuit, the output signal of the demodulator circuit being the detected amplitude modulation.

5. A television receiver as claimed in claim 2, wherein said function generator comprises a differential amplifier in which the drive voltages are received from current-controlled diodes, and wherein each diode is connected to a current source by means of a first resistor and a second resistor is connected to the electrodes of one diode.

* * * * *